United States Patent [19]
Florence et al.

[11] 3,798,500
[45] Mar. 19, 1974

[54] TIME DELAY HEADLAMP CONTROL SYSTEM

[75] Inventors: Dennis E. Florence, Detroit; Frank R. Winders, Jr., Birmingham; Charles E. Wontrobski, Southfield, all of Mich.

[73] Assignee: Chrysler Corporation, Highland Park, Mich.

[22] Filed: May 3, 1971

[21] Appl. No.: 139,333

[52] U.S. Cl.......................... 315/82, 315/77, 307/10
[51] Int. Cl............................................. B60q 1/04
[58] Field of Search.......................... 315/83, 82, 77

[56] References Cited
UNITED STATES PATENTS

| 3,544,838 | 12/1970 | Carruth et al. | 315/77 |
| 3,581,276 | 5/1971 | Newman | 315/82 |
| 3,530,333 | 9/1970 | Roberts | 315/83 |

OTHER PUBLICATIONS

Yocom: "Headlights–on Alarm" Popular Electronics Jan. 1966 p. 81

Primary Examiner—H. K. Saalbach
Attorney, Agent, or Firm—Talburtt & Baldwin

[57] ABSTRACT

A vehicle headlights control system operative to illuminate the headlamps for a preselected period of time after the headlight switch has been opened. The circuit control system is manually operated to energize a switch assembly illustrated in the form of a relay, the relay having a set of contacts associated therewith to interconnect the headlights with a source of electrical energy until such time as the relay is de-energized. A timing circuit is provided which, when timed out, will cause the relay to de-energize and disconnect the headlights from the source of electrical energy. The system further includes a door switch assembly which senses the condition of the headlight switch or running light switch being closed when the operator opens the door of the vehicle. An audio or visual signal is provided to indicate this condition.

3 Claims, 1 Drawing Figure

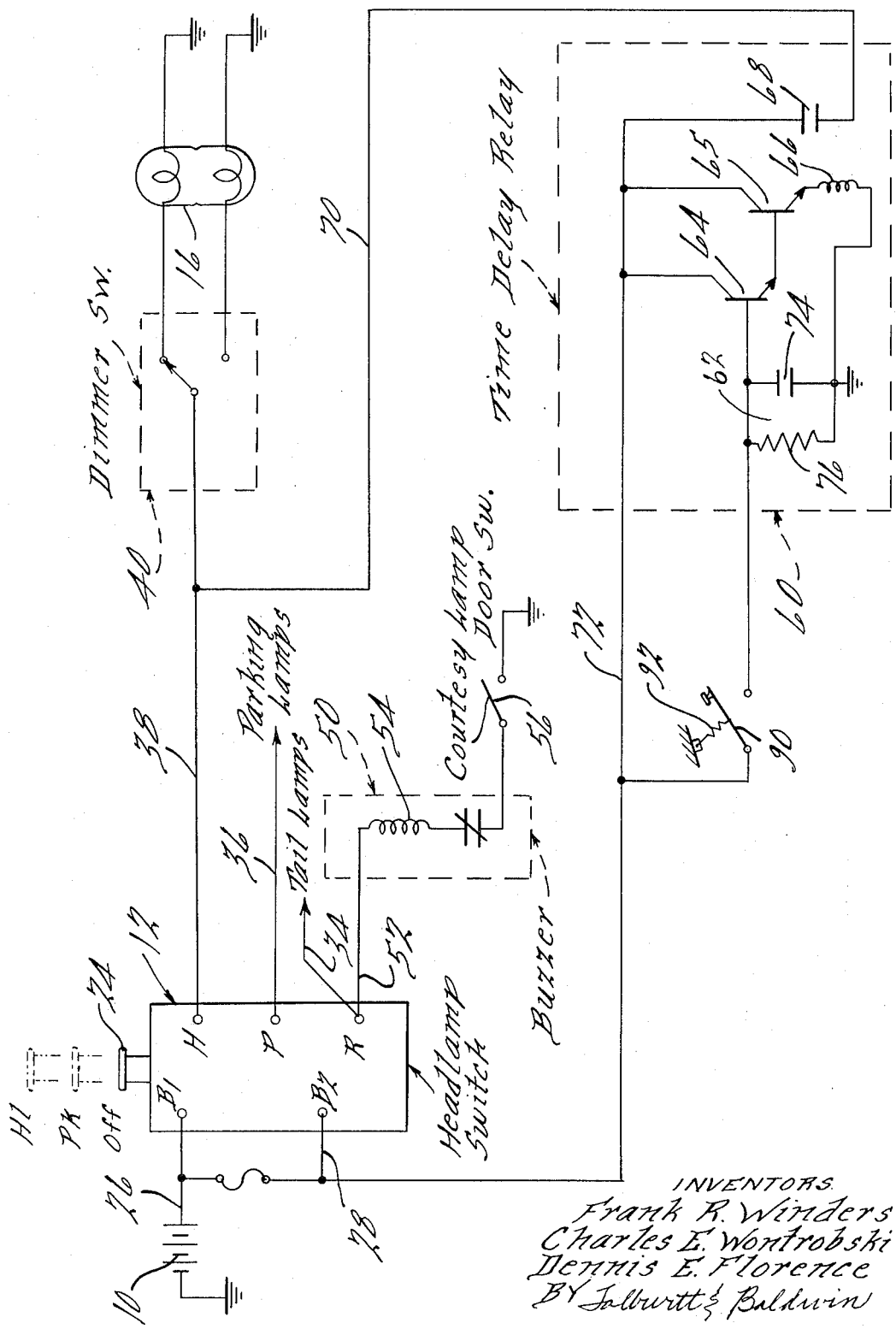

TIME DELAY HEADLAMP CONTROL SYSTEM

BACKGROUND AND SUMMARY OF THE INVENTION

This invention relates generally to a time delay control system for controlling the energization of a load and more specifically to a delay system for controlling the energization of a headlamp load on a vehicle for a preselected time period after the headlamp control switch has been opened.

The present invention provides a manual control system for controlling the energization of the headlights of a vehicle for a preselected delay period, the system being devised to provide a relatively low or practically negligible current draw during the period the system is not being utilized. The circuit of the present invention provides a reliable and inexpensive headlight delay control system which may easily be operated through an auxiliary manually operated switch after opening the headlight circuit through the headlamp and running lamp control switch.

Accordingly, it is one object of the present invention to provide an improved control circuit for controlling the deenergization of a load circuit after a preselected period of time.

It is another object of the present invention to provide an improved delay control system for use in controlling the energization of vehicle headlights.

It is still another object of the present invention to provide an improved delay control system which has a zero current drain during the period that the system is not in use.

It is still a further object of the present invention to provide an improved modified delay system which provides for a relatively low or negligible current drain during the period that the system is not in use.

It is still another object of the present invention to provide an improved manual delay control circuit.

It is a further object of the present invention to provide a delay control system for use in connection with controlling the energization of vehicle headlamps, which control system is inexpensive to manufacture and reliable in use.

Further objects, features and advantages of this invention will become apparent from a consideration of the following description made with reference to the accompanying drawing.

DESCRIPTION OF THE PREFERRED EMBODIMENT

With reference to the single FIGURE of the drawing, there is illustrated in electrical schematic form a vehicle lighting control circuit having a manually operable time delay controller and a signal warning device in accordance with the invention.

The illustrated circuit comprises the vehicle storage battery 10, the vehicle light control switch 12 for the headlamps 16, taillamps (also called running lights) and parking lamps (not shown), a signal warning circuit 50, and a time delay controller 60 controlled from a manually operable switch 90.

The vehicle light control switch 12 is the conventional operator controlled, multiple position switch customarily provided on automotive vehicles and operated by a pull or rocker type actuator 24 from an Off position to a Park position and to a Headlight position. The switch, which may contain an internal breaker, is shown connected over conductor 26 and fused conductor 28 extending from the line or input side of the switch to the positive side of the battery. Conductors 34 and 36 extend from the parking terminal (P) and the rear or taillight terminal (R) of the switch to supply current at battery potential to the parking lamps and taillamps (not shown) which are simultaneously energized over separate circuits when the switch actuator is in the Park position. With the switch actuator moved to the Headlight position, current is supplied at battery potential to the headlamps and taillamps over separate circuit conductors 38 and 34 from the headlight terminal (H) and taillight terminal (R) on the load connected side of the switch. Conductor 38 includes the customary foot operated dimmer switch 40 for selecting either the high or low beam filaments or lamps of the headlighting system.

The signal warning components and time delay lighting controller are depicted in dashed and dotted outline at 50 and 60, respectively. In accordance with one aspect of the invention these components are connected to the above described vehicle wiring circuitry in a manner without disruption of the existing wiring or disturbing the operation of the described controls thereof, which are advantageously employed in combination therewith for accomplishment of the aforementioned useful results and effects from the simplified resulting system.

The signal warning portion 50 of the system is connected by circuit conductor 52 to the taillight terminal side (R) of the vehicle light control switch and includes a signal warning device 54 and a vehicle condition responsive device 56 jointly controlling the operation of the warning device with the light control switch 12. The warning device 54 may be a signal map and/or audible signal producing device, such as a buzzer, as shown in U.S. Pat. No. 2,507,398 and connected to the device 56. The latter device may be a normally open, ground-connected seat or door actuated switch, actuated to close upon rising or departure from the vehicle and controlling the operation of the alarm device in the manner typified by U.S. Pat. Nos. 2,349,740; 2,613,258; 2,610,238 and 2,742,630 for example.

The time delay controller 60 is shown as a generalized form of relay controller having an RC timing network 62 in the input circuit of an electronic amplifier device, shown as a pair of current amplifying NPN transistors 64, 65 connected to the coil 66 of the relay. A set of normally open switching contacts of the relay are shown at 68 connected by circuit conductor 70 to the headlight terminal side of the light control switch 12 and by another circuit conductor 72 to any point at which elevated battery potential, nominally +12v, is available. Contacts 68 thus effectively shunt the headlight portion of the light control switch 12 and, when closed, provide an auxiliary energizing circuit to the vehicle headlamp circuit if the light control switch is off or open. Conductor 72 is connected internally of the time delay controller to provide +12v operating potential to the collector electrodes of the transistors 64 and 65. The emitter electrode of the transistor 64 is connected to the base of transistor 65 whose emitter is connected to one side of the relay coil 66. The other side of the coil is returned to ground or the low potential side of the battery.

In the illustrated form of the time delay controller, the charging of the capacitor 74 of the RC timing network is effected from the vehicle current source 10 through the manually operated switch 90 connected at one side to conductor 72 and at its other side to the input electrode of transistor 64 and to one side of the RC timing network in the input of the amplifier. The manually operated switch 90 may be conveniently located on the vehicle instrument panel and is shown diagrammatically as a momentary contact switch maintained in an open position by spring 92.

When the switch 90 is momentarily actuated subsequent to shutting off of the light control switch 12 or in the de-energized condition of the vehicle headlamp circuit, the transistors 64 and 65 are rendered conductive to complete an energizing circuit from B+ through output transistor 64 for the relay coil 66 and to charge the capacitor of the timing network. When the spring loaded switch 90 is released, the capacitor is no longer connected in charging circuit relation with the battery and commences to discharge through the timing resistor 76. The decaying potential developed across the resistor 76 maintains the transistors 64,65 conducting for a predetermined time interval determined by the RC time constant of the timing network. Relay 66 is thus energized and retains its contacts 68 in closed circuit completing relation, establishing an auxiliary parallel energizing circuit about or in shunt with the headlight control portion of the light control switch to maintain the energization of the headlight circuit for the aforesaid period.

Since the transistors 64,65 and the relay 66 are conductive only when the controller is in its delay control mode, the system has zero drain during those periods the controller 60 is not in use.

The warning signal or headlamps-on reminder portion of the described system functions to provide a reminder or warning signal upon departure from the vehicle to alert the attention of the operator only in the event of the operator's failure to turn off the light control switch 12 from either its Headlights On or Park position. The operator is thus warned or reminded to turn off the light control switch to prevent needless dissipation of the vehicle current. It will be noted that the signal is provided if either the headlamps and/or parking lamps remain energized through the light control switch, although only a single circuit connection is provided from the light control switch to the buzzer, which is operative for both of these lighting circuits.

As the buzzer 50 is connected to the taillight circuit of the vehicle, and neither the taillamps nor the parking lamps are energized when the energization of the headlight circuit is being maintained from the auxiliary circuit effected by the time delay controller, the alarm signal will not be activated upon operation of the switch 56, even though the headlight circuit is thus temporarily maintained and energized. Consequently, the operation of the reminder system is compatible with and related to the operation of the time delay controller, and the buzzer will not produce a false alarm that would signal an energized condition of the headlamps when their energization is maintained by the time delay controller.

Reference is hereby made to related copending application, Ser. No. 763,712 for an automatically operated form, as distinguished from a manually operated form, of headlamp time delay controller.

What is claimed is:

1. An apparatus for switching the energization of a lamp circuit of a vehicle from a source of electrical energy between a first state and a second state, the lamp circuit including a manual switch connected in circuit with the source of electrical energy and the lamp for manually controlling the lamp circuit, the improvement comprising switch means connected in circuit with the manual switch for overriding the effect of the manual switch, an actuating switch, and timing circuit means connected to the source of electrical energy and actuable to time a preselected period, including control means connected to said switch means for controlling the operation of the switch means in response to the timing said period, said actuating switch being connected to one pole of the electrical source and said control means being connected to the other pole of the source, the actuation of said actuation switch energizing said control means and said switch means, said switch means being adapted to be connected between the source of energy and the lamp circuit to place the lamp circuit in the first state at the start of said period and place the lamp circuit in the second state in response to the timing of the end of said period.

2. The invention of claim 1 wherein said control means includes a three terminal semiconductor device and a relay coil controlled by the semiconductor device, said semiconductor device having an electrode connected to said timing circuit to control the conduction of said semiconductor device in response to the timing of said period.

3. The invention of claim 1 wherein said apparatus further includes a warning circuit to indicate the condition that the lamp circuit is energized through the manual switch and another condition of the vehicle, said warning circuit including indicator means connected to the lamp circuit and energized thereby, and condition switch means controlled by the said other condition for enabling the indicator means in response to the occurrence of the other condition.

* * * * *